United States Patent [19]

Onodera et al.

[11] Patent Number: 4,698,743
[45] Date of Patent: Oct. 6, 1987

[54] RESONANCE INVERTER WITH CONTROL MEANS FOR DETECTING PEAK VOLTAGE AND HAVING A STARTING CIRCUIT

[75] Inventors: Toshihiro Onodera, Tokyo; Youichi Masuda, Yokohama, both of Japan

[73] Assignee: Kabushiki Kaisha Toshiba, Kawasaki, Japan

[21] Appl. No.: 910,979

[22] Filed: Sep. 24, 1986

[30] Foreign Application Priority Data

Sep. 25, 1985 [JP] Japan .............................. 60-211424

[51] Int. Cl.[4] ..................... H02M 7/523; H02M 7/517
[52] U.S. Cl. ................................ 363/136; 219/10.77; 363/49; 363/139
[58] Field of Search ..................... 363/36, 27, 49, 96, 363/136, 139; 219/10.77

[56] References Cited

U.S. PATENT DOCUMENTS

| | | | |
|---|---|---|---|
| 3,413,539 | 11/1968 | Lopitzsch | 363/49 |
| 4,532,583 | 7/1985 | Nemoto | 363/136 |
| 4,626,978 | 12/1986 | Thouvenin | 363/49 |

FOREIGN PATENT DOCUMENTS 26423  2/1979  Japan ................................. 363/136

OTHER PUBLICATIONS

Zhao et al, "A thyristor Inverter for Medium Frequency Induction Heating", Conf. Rec. of the Ind. Appl. Soc., IEEE-IAS, 1981 Annual Meeting, Philadelphia, Pa., USA (Oct. 5–9, 1981), pp. 962–965.

S. Bottari, et al: "High–Efficiency 200 kHz Inverter for Induction Heating Applications", 1985 IEEE, pp. 308–316.

Primary Examiner—William H. Beha, Jr.
Attorney, Agent, or Firm—Oblon, Fisher, Spivak, McClelland & Maier

[57] ABSTRACT

A resonance inverter includes a DC power source, a resonance capacitor, an inductor, and a plurality of semiconductor switches. The resonance capacitor and inductor form a parallel resonant circuit. The inverter further includes control means for detecting a peak value of the voltage across the resonance capacitor, and for alternately conducting said semiconductor switches with a certain lead phase with respect to the peak point of the capacitor terminal voltage.

9 Claims, 19 Drawing Figures

F I G. 4
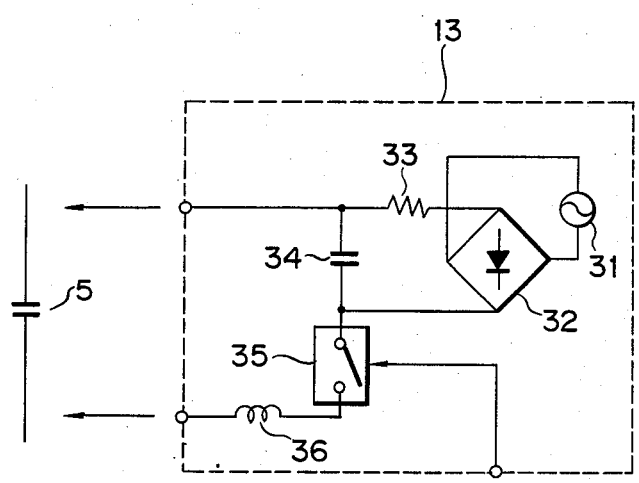

4,698,743

RESONANCE INVERTER WITH CONTROL MEANS FOR DETECTING PEAK VOLTAGE AND HAVING A STARTING CIRCUIT

BACKGROUND OF THE INVENTION

This invention relates to a resonance inverter of the type in which the charge and discharge of a resonance capacitor are controlled by several semiconductor switches.

There has been known a parallel resonance inverter. The known inverter has a parallel resonant circuit composed of a resonance capacitor and a resonance inductor. The inverter further comprises semiconductor switches such as thyristors, which control the charge and discharge of the resonance capacitor. Since this type of the resonant circuit can easily cope with even large load fluctuations, it has widely been used for various types of power source, for example, in induction heating furnaces, etc.

It is necessary for the waveform of the current flowing through the switch to have a predetermined lead phase with respect to the terminal voltage waveform of the resonance capacitor, in order for the resonance converter to operate stably. The lead phase angle of the switch current wave form in relation to the resonance capacitor terminal wave form (hereinafter called simply "lead phase angle"), in a steady state takes a fixed value, which is determined by the switch drive period circuit parameters of the resonant circuit (values of each circuit element), the load impedance, etc. However, the voltages and currents of the elements of the inverter in the build-up of the inverter are different from those in the steady state. For this reason, even if the switch drive time interval is the same as in the steady state, the lead phase angle is greatly different from that in the steady state.

FIGS. 1A to 1E show waveforms illustrating such an operation of the inverter. FIG. 1A shows the waveform of the resonance capacitor terminal voltage Vc. FIGS. 1B and 1C show the waveforms of Vg and Vg', which are applied to the gates of the two thyristors as semiconductor switches. FIGS. 1D and 1E show the waveforms of the anode voltages of these two thyristor V3 and V4. At the time of starting, the amplitude of the resonance capacitor terminal voltage fluctuates greatly (about ±50% with reference to the amplitude appearing in the steady state), as illustrated, and the reverse voltage applying time duration varies as shown by $\tau 1$ to $\tau 3$, ... When thyristors are used for switches, if at least one of the reverse voltage applying time durations $\tau 1$ to $\tau 3$, ... is shorter than the reverse recovery time of the thyristor, the thyristor turns on again to stop the inverter operation. The reverse recovery time of the thyristor means a time required for thyristor to recover its reverse characteristic.

To cope with this problem, the conventional inverter employs the technique of presetting the reverse voltage applying time duration $\tau$ in the steady state to a value with a large margin. By this technique, the thyristor can reliably turn off even for the shortest reverse voltage applying time duration $\tau m$ of those, which change time to time from the start of the inverter to an instant that the inverter operation settles down in the steady state. However, the reverse voltage applying time duration $\tau$ thus set is 2 or 3 times as long as the shortest time duration $\tau m$, and forces the inverter to operate at high reactive power.

During the period of time from the start of the inverter till the inverter operation settles down in a steady state, the reactive power is especially large and the effective power transferred to the load is small. Therefore, the time interval from the start till the steady state is reached is longer. This fact is problematic for the load requiring a quick rise of the power source voltage.

SUMMARY OF THE INVENTION

Accordingly, an object of this invention is to provide a parallel resonance inverter, which can keep constant a phase difference between the voltage across a resonance capacitor and the switch current, and can stably operate with low inductive power both in the build-up of the inverter and in the steady state of the inverter.

In the parallel resonance inverter according to this invention, a voltage across the resonance capacitor is detected. At least two semiconductor switches are alternately turned on and off at a predetermined lead phase angle with respect to a point of a peak value point of the terminal voltage. With such an arrangement, the terminal voltage of the resonance capacitor can have a fixed phase difference with respect to the current of the semiconductor switch.

In the resonance inverter according to this invention, a phase difference between the terminal voltage waveform of the resonance capacitor and the current waveform of the semiconductor switch can be kept at the fixed value from the start to the steady state. Therefore, in the semiconductor switch requiring the reverse recovery time, such as thyristors, a fixed commutation marginal angle can be secured, resulting in a stable operation of the inverter.

The fact that the commutation marginal angle is not varied in the build-up, reduces the operating period of the inverter up to the minimum time necessary for securing that reverse recovery time. This enables the inverter to operate with low reactive power both in the build-up of the inverter and in the steady state operation. Especially the small reactive power in the build-up reduces the time interval from the start of the inverter to the steady state. Therefore, the inverter of this invention is very useful when coupled with the load requiring a quick rise of the power voltage.

Further, during the period from the phase corresponding to the reverse recovery time to $\pi/2$ radian, the reactive power and the output power as well can be controlled. The time interval from the inverter build-up to its steady state of the inverter, during which no control is applied in the conventional inverter, can also be reduced to the half or less. This is realized by forcibly operating the inverter, with a certain commutation marginal angle.

BRIEF DESCRIPTION OF THE DRAWINGS

FIG. 4 shows a circuit arrangement of a starter used in the inverter shown in FIG. 2;

DETAILED DESCRIPTION OF THE PREFERRED EMBODIMENT

Figure 2:
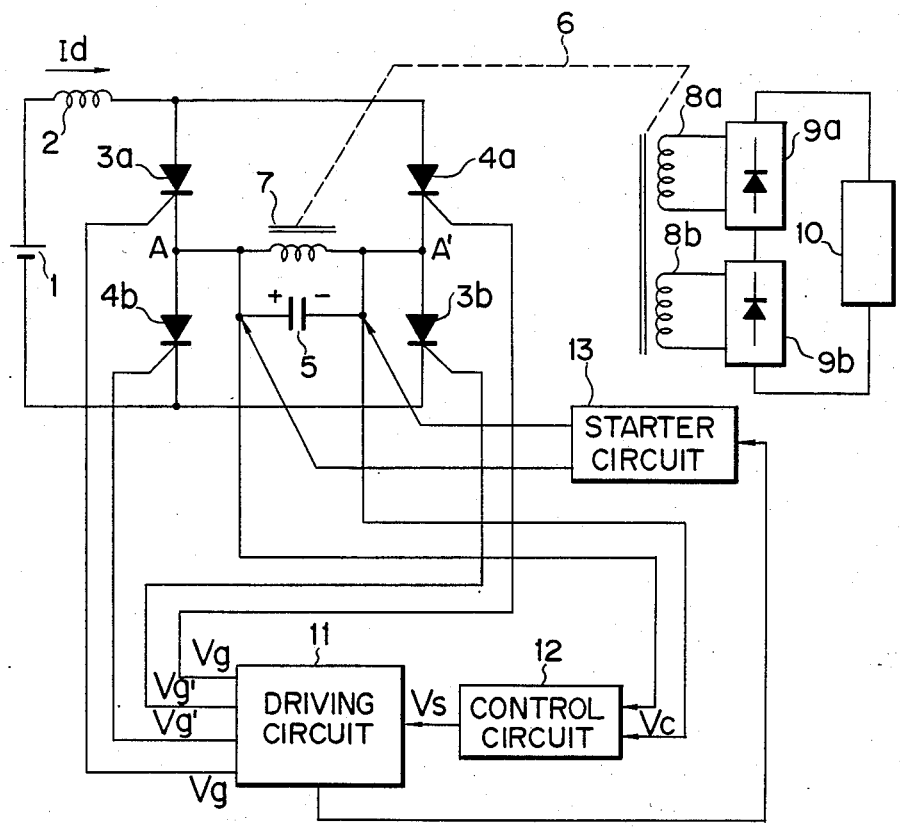
FIG. 2 shows a circuit arrangement of a resonance inverter according to one embodiment of this invention.

The configuration of the parallel resonance converter, as used in one embodiment of this invention, is shown in FIG. 2.

The parallel resonance converter is composed of a DC power supply 1, choke coil 2, thyristors 3a, 3b, 4a, and 4b, resonance capacitor 5, transformer 6, primary coil 7, secondary coils 8a and 8b, rectifiers 9a and 9b, load 10, drive circuit 11, control circuit 12, and starter circuit 13.

A bridge circuit composed of 4 thyristors 3a, 3b, 4a and 4b is connected through choke coil 2 to the DC power supply. A parallel circuit, including resonance capacitor 5 and inductor 7 (the primary coil of transformer 6), is connected between mid points A and A' of this bridge circuit. Transformer 6 has two secondary coils 8a and 8b, which are connected to rectifiers 9a and 9b respectively. Rectifiers 9a and 9b are connected to load 10 in a manner that are their outputs are added together, and their combined power supplied to the load.

The control section that causes thyristors 3a, 3b, 4a, and 4b to turn alternately on (conductive) and off (non-conductive), is composed of drive circuit 11, and control circuit 12. Drive circuit 11 is comprised of a circuit which generates trigger pulses applied to the gates of thyristors 3a, 3b, 4a and 4b and the control signals for starter circuit 13 at the time of start. Control circuit 12 detects the resonance capacitor terminal voltage, and controls the operation of drive circuit 11 so that thyristors 3a, 3b, 4a and 4b are turned on and off in synchronism with the variation of this terminal voltage. Also, starter circuit 13 is connected to both ends of resonance capacitor 5.

Figure 3:
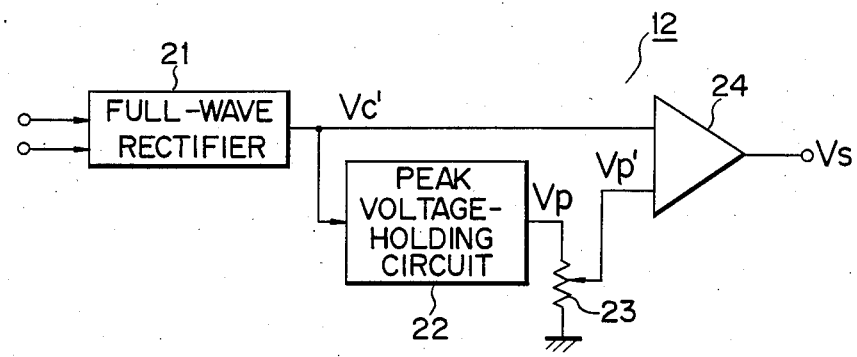
FIG. 3 is a block diagram illustrating the detail arrangement of a control circuit of the inverter of FIG. 2.

Control circuit 12, as illustrated in FIG. 3, is composed of full-wave rectifier circuit 21, peak voltage hold circuit 22, voltage divider circuit 23, and comparator 24. Full-wave rectifier circuit 21 rectifies the terminal voltage of resonance capacitor 5. Peak voltage hold circuit 22 holds the peak voltage of the output of rectifier circuit 21. Voltage divider circuit 23 divides the output of peak voltage hold circuit 22. Comparator 24 receives the output of voltage divider circuit 23, as a reference voltage, and compares it with the output voltage of rectifier circuit 21. The output pulse of comparator 24 is applied to drive circuit 11, as a synchronizing pulse.

Starter circuit 13, as shown in FIG. 4, is composed of a DC power supply made up of AC power supply 31 and rectifier circuit 32, capacitor 34 which is charged via resistor 33 by the DC output, and inductor 36. Two terminals of starter circuit 13, in which capacitor 34, electronic switch 35, and inductor 36 are connected in series, are connected to the respective sides of resonance capacitor 5. Electronic switch 35 is turned on and off by the control signal applied from drive circuit 11.

Figure 5:
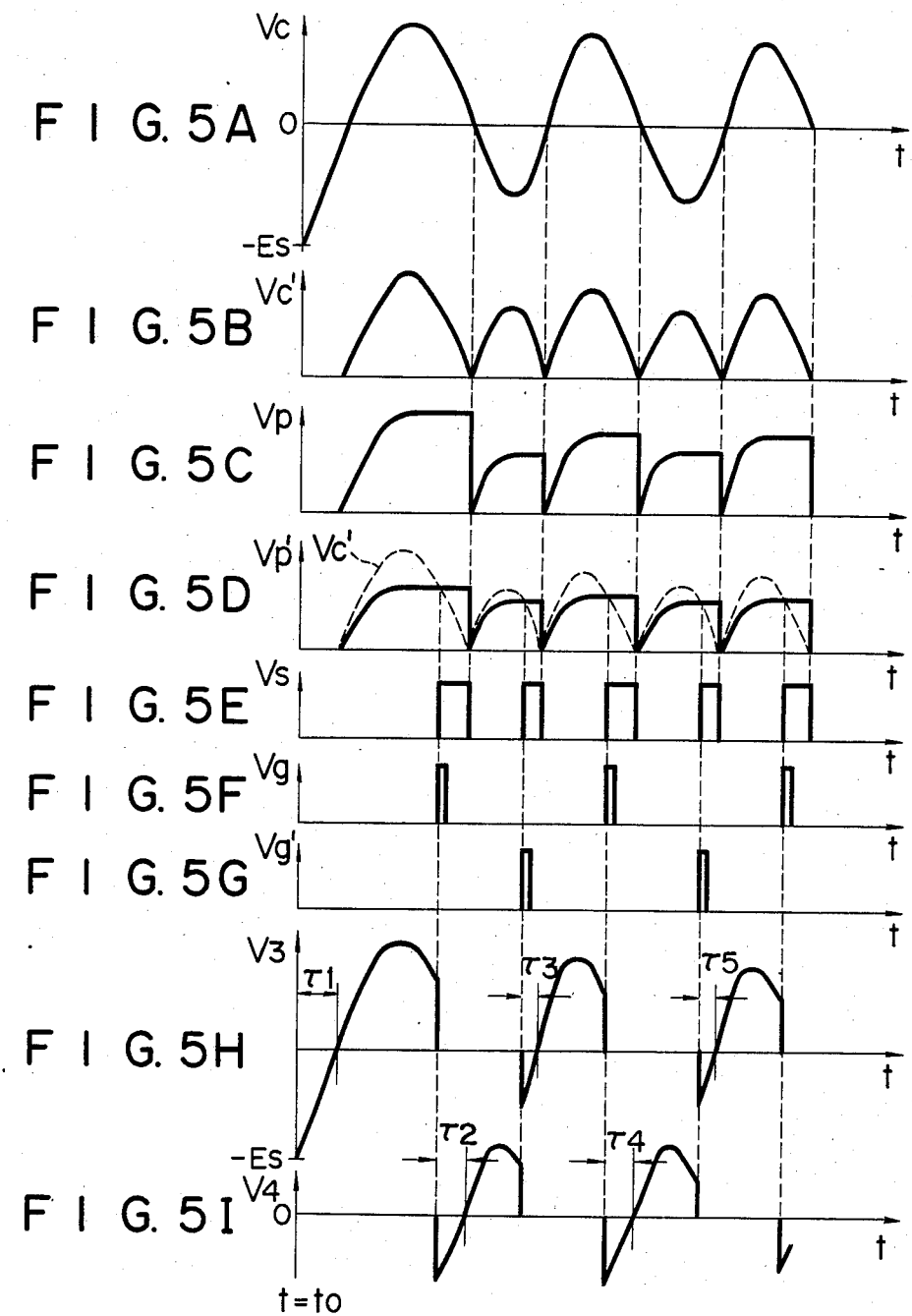
FIGS. 5A to 5I show waveforms at the key portions of the inverter shown in FIGS. 2 to 4, which are for explaining the operation of the inverter.

Next, the operation of this resonance inverter will be explained with reference to the waveforms in FIGS. 5A to 5I. FIG. 5A is the waveform of the terminal voltage of resonance capacitor 5. FIG. 5B is the output waveform of full-wave rectifier circuit 21. FIG. 5C is the output waveform of peak voltage hold circuit 22. FIG. 5D is the output waveform of voltage divider circuit 23. FIG. 5E is the output waveform of comparator 24. FIGS. 5F and 5G are the waveforms of the trigger pulses applied to thyristors 3a, 3b, 4a and 4b respectively. FIGS. 5H and 5I are the anode voltage waveforms of thyristors 3a, 3b, 4a and 4b respectively.

When operation is begun, to ensure a reliable start operation, drive circuit 11 places all the thyristors 3a, 3b, 4a and 4b in a conductive state, and keeps them conducting until the current Id necessary for steady operation is flowing in choke coil 2. When the current flowing in choke coil 2 reaches the value Id, a signal is sent to starter circuit 13, which then charges resonance capacitor 5. Resonance capacitor 5 is charged up to the voltage Es required for starting by starter circuit 13 in a short time as compared with the operating frequency. More specifically, in the starter circuit, capacitor 34 is pre-charged, before starting, by the DC power supply composed of AC power supply 31, and rectifier circuit 32, via resistor 33. When switch 35 is turned on by the signal applied from drive circuit 11, the electrical charge stored in capacitor 34 is supplied to resonance capacitor 5 via coil 36. At this time, if the resonance capacitor has been stored with the polarity as shown, a reverse voltage Es will be applied to thyristors 3a and 3b and they will be turned off. The anode voltage of thyristors 3a and 3b (V3) ascends and then descends, as shown in FIG. 5H, along a resonance curve determined by the capacitance of resonance capacitor 5, the excitation inductance Lp and the leakage inductance Le of transformer 6, and the impedance of load 10.

Next, when trigger pulse Vg is applied to thyristors 3a and 3b, these thyristors are turned on, and their anode voltage V3 becomes zero. At the same time, thyristors 4a and 4b are turned on by the application of a reverse voltage, and the anode voltage V4 varies along the resonance curve. Then, trigger pulse Vg' is applied to thyristors 4a and 4b, which causes them to turn on, and at the same time thyristors 3a and 3b are turned off by the application of a reverse voltage, and the operation explained above is repeated. As a result of this operation, the oscillation waveform of the terminal voltage of resonance capacitor 5 is as shown in FIG. 5A. This operation is repeated until the steady state is reached. Electronic switch 35 of starter circuit 13 is controlled by a control signal, so it remains on only for the time necessary for resonance capacitor to be charged, and then turns off. When a thyristor is used as switch 35, only a trigger signal needs to be applied to turn it on, and it is turned off when, after capacitor 5 is charged, the charging current drops below the value of the holding current.

Figure 1:
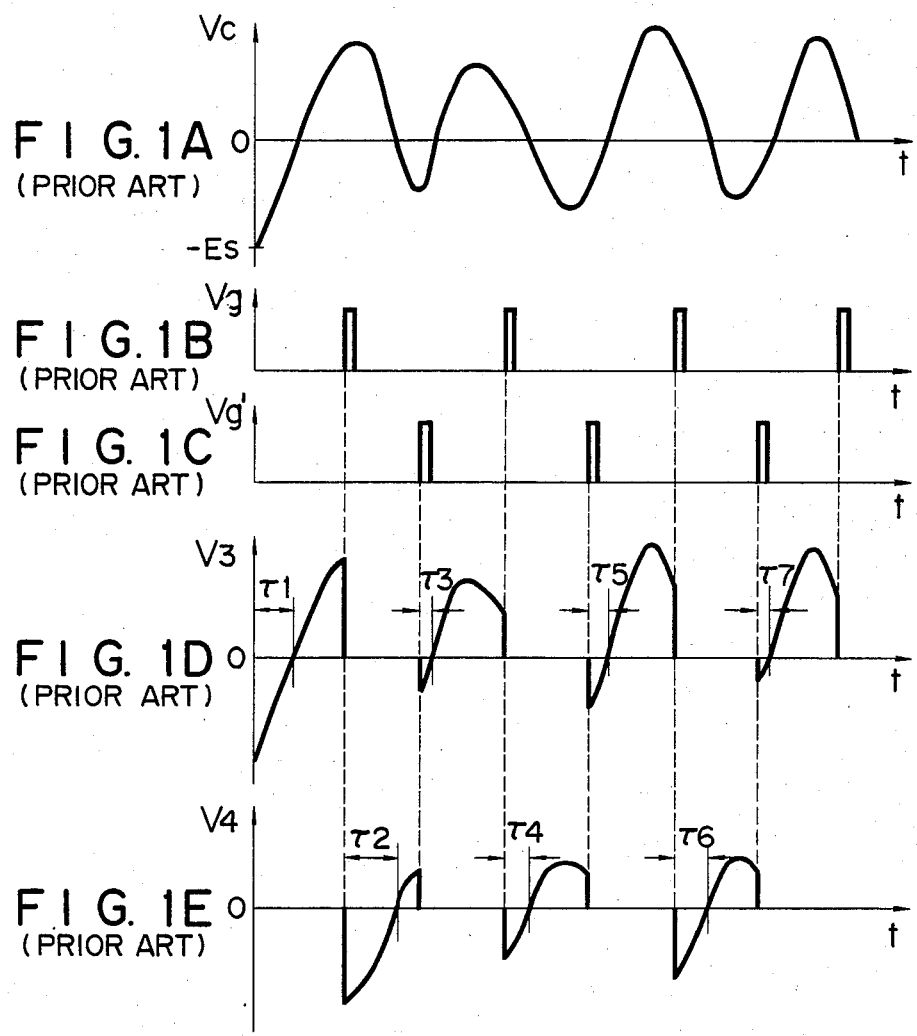
FIGS. 1A to 1E show waveforms at key portions of a conventional resonance inverter, which are useful in explaining the operation of that inverter.

Conventional resonance inverters do not use a control function as implemented by control circuit 12 of FIG. 1. At a fixed cycle determined by the self-oscillation frequency of an oscillator circuit provided in the circuit corresponding to the drive circuit 11, the thyristor trigger pulses Vg and Vg' are generated, as shown in FIGS. 1B and 1C.

For this reason, the reverse voltage applying time duration varies with the amplitude variation of the terminal voltage waveform of the resonance capacitor.

This is a problem of the conventional inverter. On the other hand, in the inverter according to this invention, to solve this problem, the trigger pulses generated by drive circuit 11 are forcibly synchronized with the variation of the terminal voltage of resonance capacitor 5, by control circuit 12.

The operation of control circuit 12 will be explained in detail.

The terminal voltage Vc of resonance capacitor 5, as shown in FIG. 5A, is input to full-wave rectifier circuit 21 in control circuit 12, and is rectified as shown in FIG. 5B. The output voltage Vc' of rectifier circuit 21 is input to peak voltage hold circuit 22, and the peak voltage is held. When output voltage Vc' of rectifier circuit 21 reaches the peak voltage value, and then falls to below the specified voltage, the peak voltage hold circuit 22 resets itself, and its output voltage Vp becomes zero. Therefore, the output voltage waveform of peak voltage hold circuit 22 will be as shown in FIG. 5C. Voltage divider circuit 23 divides this output voltage of peak voltage hold circuit 22, and obtains output voltage Vp', as shown in FIG. 5D. Comparator 24 compares the output voltage Vp' of voltage divider circuit 23, which is used as the reference voltage, with the output voltage Vc' of rectifier circuit 21, and generates an output pulse Vs, as shown in FIG. 5E. The output pulse Vs of comparator 24 is input to drive circuit 11, which is constructed with an oscillator circuit, as a synchronizing pulse, and then trigger pulses Vg and Vg', as shown in FIGS. 5F and 5G, are generated from drive circuit 11. Each of these trigger pulses Vg and Vg' have a certain phase difference with respect to the waveform of the terminal voltage of resonance capacitor 5. Therefore, the values of the reverse voltage applying time durations τ1, τ3, τ2 and τ4 of thyristors 3a, 3b, 4a and 4b satisfy the requirement of thyristors 3a, 3b, 4a and 4b even if the amplitude of the waveform of the terminal voltage of resonance capacitor 5 varies greatly at the start of operation of the inverter.

The trigger pulses Vg and Vg' are generated after the time point of the peak value of each of the positive and negative half waves of the terminal voltage Vc of resonance capacitor. Therefore, no trigger pulse is generated before the resonance capacitor terminal voltage is reached, although the first pulse of the trigger pulses Vg appears before the peak point in FIG. 1A illustrating the operation of the conventional inverter. This fact ensures that the resonance current is always opposite in direction to the current Id flowing through the cholk coil 2. Therefore, the power injection can effectively be made by current Id according to a load 10 for the resonant circuit, which is made up of capacitor 5 and transformer 6.

As described above, in the resonance inverter of this embodiment, since the reverse voltage applying time duration of the thyristor is fixed as a phase segment, the inverter is operable with low reactive power. Also the time interval from the start of the inverter to its steady state. The inverter operates as in the steady state. This implies that the inverter operation is quickly settled down in the steady state, improving the rise time of the inverter.

It should be understood that this invention is not limited to the above-mentioned embodiment, but it may variously be changed and modified within the scope of this invention.

Figure 6:
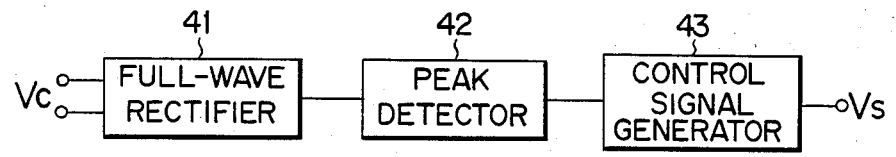
FIG. 6 is a block diagram illustrating a part of a resonance inverter according to another embodiment of this invention.

Control circuit 12 may be arranged as shown in FIG. 6.

In the figure, the output of full-wave rectifier 41 for rectifying the voltage across resonance capacitor 5 is input to peak detector 42. The output of peak detector 42 is applied to control signal generator 43. The control signal Vs output from control signal generator 43 is applied, as a synchronizing pulse, to drive circuit 11. In this case, control signal generator 43 is constructed as an arithmetic circuit, for example. Control signal generator 43 executes an appropriate operation using the peak value of the resonance capacitor terminal voltage Vc and the time point that the terminal voltage Vc reaches the peak value. As the result of the operation, after a predetermined lead phase from that peak point, trigger pulses are generated for thyristors 3a, 3b, 4a, and 4b. In this way, as in the above-mentioned embodiment, the phase difference between the terminal voltage of resonance capacitor 5 and the current flowing to those thyristors can always be kept at a fixed value.

Figure 7:
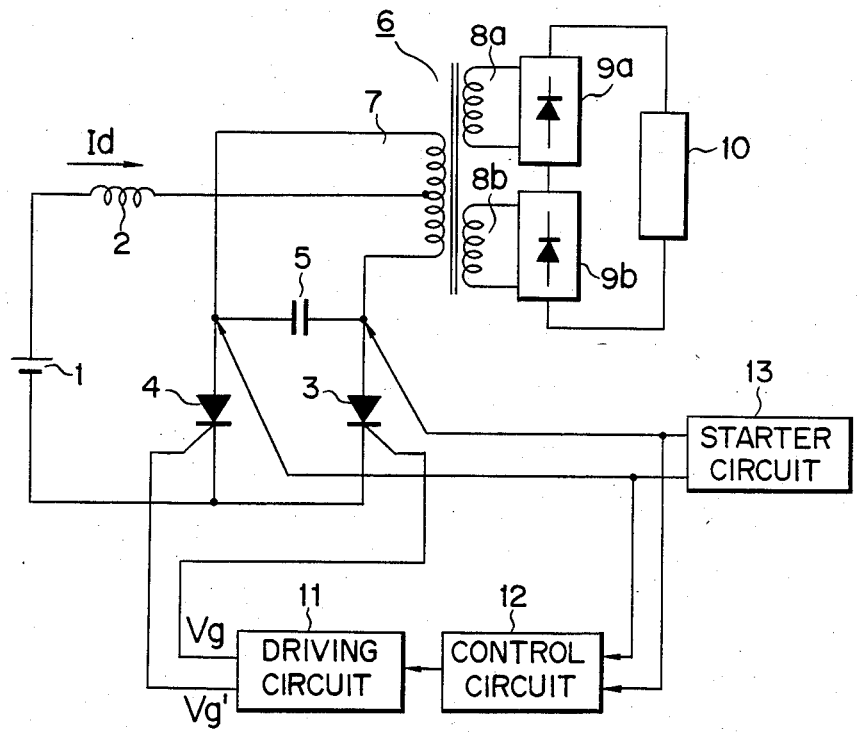
FIG. 7 shows a circuit arrangement of a resonance inverter according to yet another embodiment of this invention.

While the resonance inverter of FIG. 2 is a bridge inverter using a full bridge circuit including thyristors, it may be implemented by a push-pull inverter as shown in FIG. 7. In FIG. 7, like difference symbols are used to designate the like or equivalent portions in FIG. 1. In this case, the primary coil 7' of the transformer 6 has a mid-point tap where it is connected to choke coil 2. Thyristors 3 and 4 are made alternately conductive. In each conduction, the DC power source applies reverse voltage to resonance capacitor 5.

It is evident that other elements than thyristors may be used for the semiconductor switches constituting the inverter. It is noted that the inverter of this invention is very useful when the semiconductor switches have reverse recovery times.

What is claimed is:

1. A resonance inverter comprising:
   a resonance capacitor;
   an inductor connected in parallel with said resonance capacitor, to form a parallel resonant circuit;
   at least two semiconductor switches provided between said resonance capacitor and said DC power source, to control the charge/discharge of said capacitor; and
   control means to alternately render conductive said semiconductor switches, with a certain lead phase difference with respect to the peak point of a peak value of the voltage across said resonance capacitor;
   said control means including:
   reference voltage generating means for generating the peak value of the voltage across said resonance capacitor, and producing a reference voltage, which is lower than said peak value, but proportional to said peak value;
   comparing means for comparing said reference voltage and said capacitor terminal voltage, and producing pulses with a predetermined lead phase difference with respect to said terminal voltage; and
   switch drive means for generating trigger pulses to render said switches conductive in response to the output pulse from said comparing means.

2. A resonance inverter according to claim 1, in which said reference voltage generating means includes a peak hold circuit for holding said peak voltage, and attenuating means for attenuating said peak voltage held by said peak hold circuit.

3. A resonance inverter according to claim 2, in which said attenuating means is a voltage divider.

4. A resonance inverter according to claim 1, in which said control means comprises peak detecting means for detecting the peak value of said capacitor terminal voltage, pulse generating means for generating pulses with a predetermined lead phase angle with respect to the peak point of said terminal voltage on the basis of the detection results from said peak detecting means, switch drive means for generating trigger pulses to render conductive said switches in response to the output of said pulse generating means.

5. A resonance inverter according to claim 1, in which said semiconductor switches are thyristors.

6. A resonance inverter according to claim 1, in which said semiconductor switches are two semiconductor switches forming a push-pull inverter in which said switches are selectively conducted, to apply an inverse voltage from said DC power source to said resonance capacitor.

7. A resonance inverter according to claim 1, in which said semiconductor switches are four semiconductor switches connected in a bridge fashion to form a bridge inverter.

8. A resonance inverter according to claim 1, in which said inductor includes inductance of an output transformer for supplying the output to a load.

9. A resonance inverter according to claim 1, further comprising a choke coil connected in series to the DC power source.

* * * * *